UNITED STATES PATENT OFFICE.

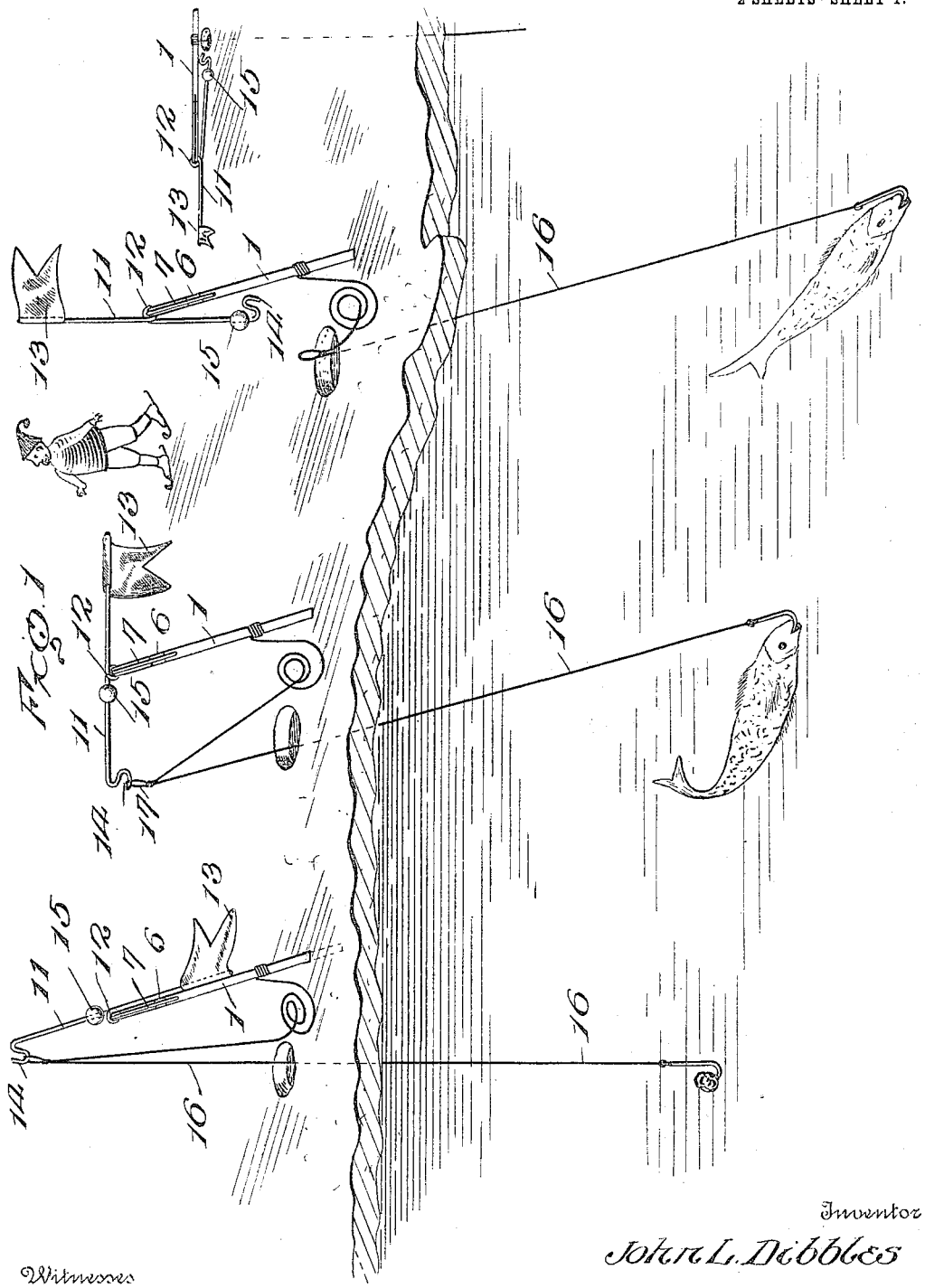

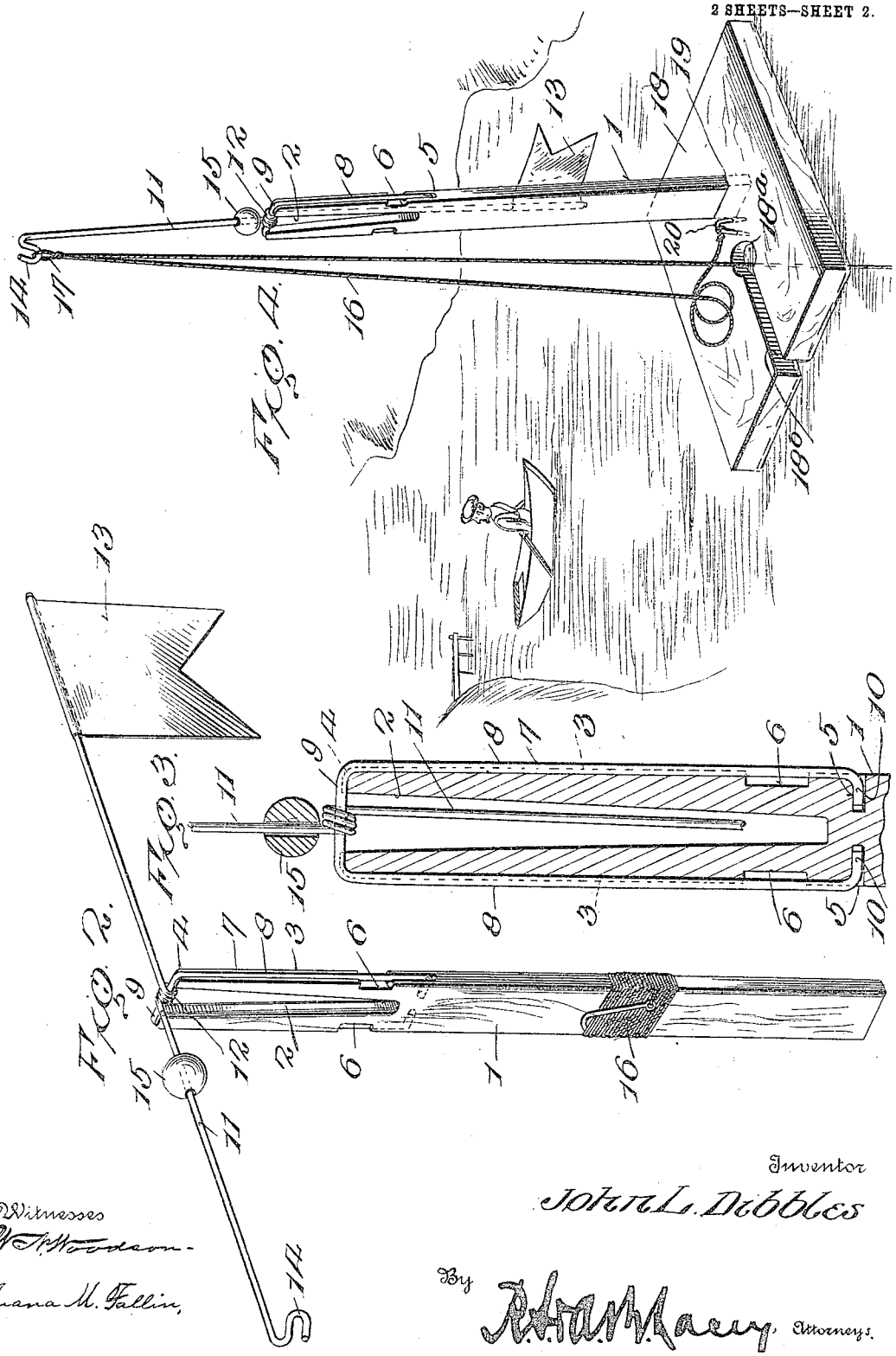

JOHN L. DIBBLES, OF CHICAGO, ILLINOIS.

FISHING-SIGNAL.

962,420.  Specification of Letters Patent.  Patented June 28, 1910.

Application filed February 24, 1910. Serial No. 545,719.

*To all whom it may concern:*

Be it known that I, JOHN L. DIBBLES, a subject of the King of Sweden, residing at Chicago, in the county of Cook and State of Illinois, have invented certain new and useful Improvements in Fishing-Signals, of which the following is a specification.

This invention has for its object a simple and efficient construction of signaling device for use in fishing, designed to display a visual signal by uplifting a flag when the fish is hooked, and the invention consists in certain constructions, arrangements and combinations of the parts that I shall hereinafter fully describe and claim.

For a full understanding of the invention, reference is to be had to the following description and accompanying drawings, in which:

Figure 1 is a perspective view illustrating one application of my improved fishing signal, the device being shown in different positions; Fig. 2 is an enlarged perspective view of the device; Fig. 3 is a sectional view of a portion thereof; Fig. 4 is a perspective view illustrating another application of the invention.

Corresponding and like parts are referred to in the following description and indicated in all the views of the drawings by the same reference characters.

The present embodiment of my invention comprises a standard 1 which may be of any desired substance and of any desired size, the said standard being preferably forked at one end, as indicated at 2, and being provided in its side edges at the forked portion with recesses 3 merging into end recesses 4. At the inner ends of the grooves 3, the standard 1 is formed with sockets 5, and near the sockets the grooved side edges are cut out, as indicated at 6.

In connection with the standard 1 I employ a frame 7 which is preferably constructed of wire, the said frame embodying side members 8 adapted to lie in the grooves 3, a cross bar 9 connecting the side members together at one end and adapted to lie in the end recessed 4, and inwardly turned ends 10 adapted to snap into the sockets 5. By this construction, the frame 7 may be easily secured to and detached from the standard 1 and when in place will be securely held on the standard.

11 designates the signal arm. In the present instance this arm is also constructed of a single piece of wire, like the frame 7, and a flag or pennant 13 of any desired character is secured to one end of said arm. The wire forming the arm is coiled upon itself any desired number of times intermediate of its ends, as indicated at 12, so as to fit on the cross bar 9 of the frame 7, the arm being thereby pivotally mounted on the frame and pivotally connected to the standard so as to swing to a substantially upright or inverted position as concerns the flag 13. The arm 11 is provided at its end opposite the flag 13 with a hook 14. A ball weight 15 of lead or the like is mounted on the signal arm between the coils 12 and the hook 14 and is adapted to slide on this portion of the arm, its movement in one direction being limited by the coils and its movement in the opposite direction being limited by the hook. Obviously, when the weight is moved up to the coiled portion of the arm, the arm may be easily held or maintained in an inverted position, but when the end of the arm is pulled downwardly far enough for the weight to commence to slide away from the coils 12 and toward the hook 14, the arm will be quickly righted or swung around so as to present the flag 13 in its uppermost position.

From the foregoing description in connection with the accompanying drawing, the operation of my improved fishing signal will be apparent. In the practical use of the device, if it be used for fishing through ice for instance, the fisherman will cut a hole in the ice, say, of a size slightly less than the length of the standard 1 so that the fish may be easily withdrawn therethrough, and will also cut another small hole in proximity to the large hole and place one end of the standard in the small hole so that the standard may be held in an upwardly projecting position, but preferably slightly inclined over the larger hole. One end of the fishing line 16 is secured to the standard 1 and the line is preferably detachably engaged with the hook 14 by being run through a loop or ring 17 which is engaged over the hook. The baited end of the line is then let down through the opening in the ice and provided with sinkers in the usual manner. As soon as a fish is hooked, his effort to escape, of course, pulls downwardly on the hook end of the signal arm 11 and this will cause the flag to move upwardly and the weight to move down toward the hooked end of the arm so as to hold the flag in its upper position and thereby indicate to the fisherman that a fish has been caught. In case the efforts of the fish to escape result in upsetting the standard, it is obvious that it will merely fall across the opening in the ice and the apparatus will not be lost.

It is, of course, to be understood that my invention is not limited to the operation of fishing through the ice, but that the standard may be secured to a pier, wharf or the like, or to a boat or float. As one embodiment of this application, reference is to be had to Fig. 4, wherein it will be seen that I have provided a float 18 which may be of any desired size or character so long as it has the requisite buoyancy, the said float being provided with a recess 19 in which one end of the standard 1 may be fitted so as to support the standard upright or in an inclined position, and in this embodiment of the invention I may secure one end of the line to a staple or eye 20, instead of securing it to the standard. The float 18 is formed with an opening 18$^a$ for the line to pass through and with a slot 18$^b$ leading outwardly from said opening so that the line may be easily inserted and removed.

It will thus be seen that I have provided a very simple, durable and efficient construction of fishing signal, the parts of which may be cheaply manufactured and readily assembled and disassembled. In view of the fact that the frame 7 is detachably connected to the standard 1, it is obvious that the parts may be detached from each other so as to economize space in packing and shipment. The cut out portions 6 of the standard will facilitate the detachment of the frame from the standard and will form openings by which the side members 8 may be conveniently grasped.

Having thus described the invention, what is claimed as new is:

1. A fishing signal comprising a standard formed in its side edges with longitudinal grooves, a frame embodying a cross bar extending across the ends of the standard and side members held in said grooves and a signal arm pivotally mounted intermediate of its ends on said cross bar.

2. A fishing signal, comprising a standard provided at one end with a fork, the standard being formed in its side edges at the forked end with longitudinally extending grooves and with end recesses in which the grooves merge, the standard being further formed at the inner ends of the grooves with sockets, a frame embodying a cross bar adapted to be seated in the end recesses and with side arms adapted to be seated in the grooves, the side arms having inwardly extending ends adapted to extend into the sockets, a signal arm pivotally mounted intermediate of its ends on the cross bar, and a flag connected to one end of said signal arm.

3. A fishing signal, comprising a standard, a frame embodying side members and a cross bar, the standard being formed with grooves receiving said side members, the side members being formed with inturned ends and the standard being formed with sockets adapted to receive said ends, the standard being further formed with cut out portions in proximity to said sockets, for the purpose specified, and a signal arm pivotally mounted intermediate of its ends on the cross bar.

In testimony whereof I affix my signature in presence of two witnesses.

JOHN L. DIBBLES. [L. S.]

Witnesses:
J. WARNER BECKSTORM,
M. C. ALLEN.